United States Patent
Baroudi et al.

(10) Patent No.: US 9,838,943 B2
(45) Date of Patent: Dec. 5, 2017

(54) METHOD OF ROUTING FOR WIRELESS AD HOC AND SENSOR NETWORKS

(71) Applicant: KING FAHD UNIVERSITY OF PETROLEUM AND MINERALS, Dhahran (SA)

(72) Inventors: Uthman Baroudi, Dhahran (SA); Md. Enamul Haque, Chuadanga (BD)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/951,473

(22) Filed: Nov. 24, 2015

(65) Prior Publication Data

US 2017/0150417 A1    May 25, 2017

(51) Int. Cl.
  *H04W 40/08* (2009.01)
  *H04W 24/02* (2009.01)

(52) U.S. Cl.
  CPC ........... *H04W 40/08* (2013.01); *H04W 24/02* (2013.01)

(58) Field of Classification Search
  CPC .............................. H04W 40/08; H04W 24/02
  See application file for complete search history.

(56) References Cited

U.S. PATENT DOCUMENTS

| 8,315,231 | B2 | 11/2012 | Pirzada et al. | |
| 2005/0159111 | A1* | 7/2005 | Kim | H04L 45/00 455/67.14 |
| 2006/0178156 | A1 | 8/2006 | Kim | |
| 2015/0078182 | A1 | 3/2015 | Das et al. | |

FOREIGN PATENT DOCUMENTS

CN    103228022 A    7/2013

OTHER PUBLICATIONS

Obaidat et al., "Deesr: Dynamic Energy Efficient and Secure Routing Protocol for Wireless Sensor Networks in Urban Environments," Journal of Information Processing Systems, vol. 6, No. 3, Sep. 2010.
Mishra et al., "A Novel Grid Based Dynamic Energy Efficient Routing Approach for Highly Dense Mobile Ad Hoc Networks," International Journal of Ad hoc, Sensor & Ubiquitous Computing, vol. 4, No. 3, Jun. 2013.

* cited by examiner

*Primary Examiner* — Ian N Moore
*Assistant Examiner* — Justin T Van Roie
(74) *Attorney, Agent, or Firm* — Oblon, McClelland, Maier & Neustadt, L.L.P.

(57) ABSTRACT

The method of routing for wireless ad hoc and sensor networks is a routing protocol that uses a greedy approach, selecting the best route having the maximum remaining energy above a pre-defined threshold limit. The method of routing for wireless ad hoc and sensor networks is an energy efficient routing protocol, in that the routing path is selected to maximize the lifetime of an individual source-destination pair by selecting a route between them that is based on the energy levels of neighboring nodes, without requiring an energy-intensive network flooding approach. The routing path between a source node and a destination node is selected by choosing, at each node, a neighboring node that has the greatest remaining energy level.

2 Claims, 10 Drawing Sheets

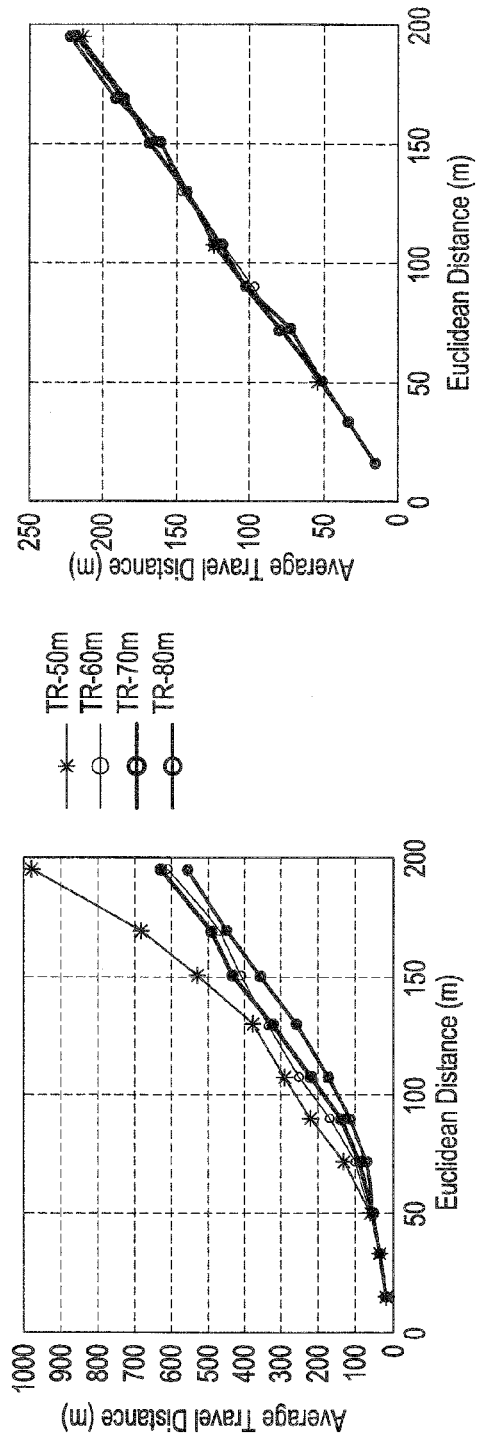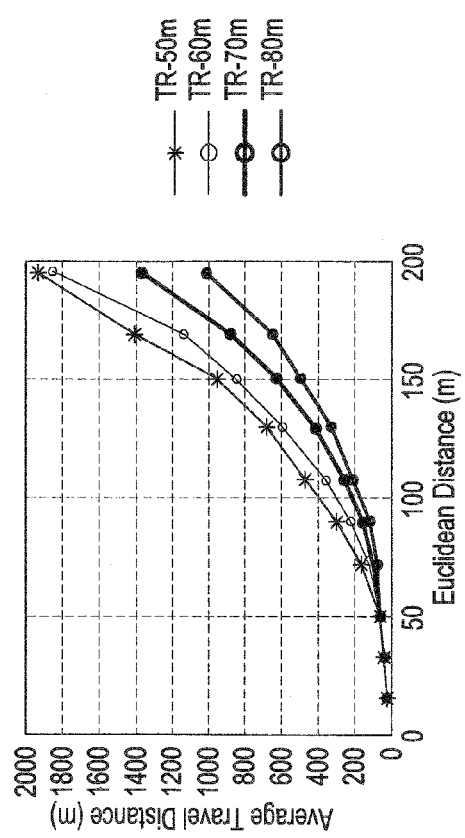
Fig. 6A
Fig. 6B
Fig. 6C

METHOD OF ROUTING FOR WIRELESS AD HOC AND SENSOR NETWORKS

BACKGROUND OF THE INVENTION

1. Field of the Invention

The present invention relates to wireless networks, and particularly to a method of routing for wireless ad hoc and sensor networks defining a protocol based on the remaining energy of each wireless sensor node.

2. Description of the Related Art

A wireless ad hoc network (WANET) is a decentralized type of wireless network. The network is "ad hoc" because it does not rely on a pre-existing infrastructure, such as routers in wired networks or access points in managed (infrastructure) wireless networks. Rather, each node participates in routing by forwarding data for other nodes, so that the determination of which nodes forward data is made dynamically on the basis of network connectivity.

Routing in both WANETs and typical wireless sensor networks is typically governed by proactive routing, reactive routing, hybrid routing or position-based routing. Proactive routing protocols maintain fresh lists of destinations and their routes by periodically distributing routing tables throughout the network. Examples of such routing include the Optimized Link State Routing Protocol (OLSR) and distance vector routing. However, such proactive routing algorithms include the large amounts of data involved and the relatively slow reaction time for restructuring and failures. Additionally, although proactive routing protocols provide routes that are readily available when needed, energy consumption for sensor networks is excessive, since sensor devices have very limited energy sources (typically in the form of rechargeable batteries).

Reactive routing protocols find a route on demand by flooding the network with route request packets. Such flooding protocols, however, necessarily require a high latency time in route finding, and further, excessive flooding can lead to network clogging. A typical example of such a reactive routing protocol is the Ad hoc On-Demand Distance Vector (AODV) protocol. Hybrid routing protocols, such as the Zone Routing Protocol (ZRP), combine proactive and reactive routing schemes. The hybrid routing is initially established with some proactively prospected routes and then serves the demand from additionally activated nodes through reactive flooding. The choice of one or the other method requires predetermination for typical cases.

Position-based routing, such as Location-Aided Routing (LAR), requires the use of precise information on the exact locations of the nodes. This information is typically obtained via a global positioning system (GPS) receiver or the like, and can only be implemented when precisely accurate geographic information is possible for all nodes. Based on the exact locations, the best path between source and destination nodes can be determined.

The above typical routing protocols for WANETs and wireless sensor networks commonly suffer from problems with reliability. Most of the presently available routing algorithms attempt to find a desired route from the source to the destination before sending any data packets. Such protocols are susceptible to unreliable transmission when intermediate nodes are prone to change their configurations at regular intervals (i.e., changes in power, location, transmission mode, etc.

Additionally, the above typical routing protocols often suffer from degradation of performance when flawed sensor nodes intermittently arise. In order to minimize the effect of this issue, the portals try to explore alternate routes from the source or the faulty nodes to the destination for retransmission. However, this optimization problem is NP-complete, and the route information is unavailable for ad hoc networks. Thus, using one of the typical protocols for formulating a solution becomes an intrinsically complex problem.

Further, wireless sensor networks typically consist of a very large number of nodes. New nodes are likely to be added when necessary. It is much easier to maintain scalability in centralized wireless networks, such as cellular networks, because the scalability can be controlled centrally. However, ad hoc wireless networks do not have this capability, since the sensor nodes operate and collaborate in a cooperative manner. If any new node wants to join in the collaboration, it needs to be introduced with the whole network. Existing protocols, such as those described above, handle this issue by flooding the new node's information to its neighbor nodes, and it is propagated to every other node as well, in order to ensure scalability. This results in the flooding discussed above, and an additional problem of minimizing energy consumption while scaling the network.

Thus, a method of routing for wireless ad hoc and sensor networks addressing the aforementioned problems is desired.

SUMMARY OF THE INVENTION

The method of routing for wireless ad hoc and sensor networks is a routing protocol that uses a "greedy" approach, selecting the best route having the maximum remaining energy above a pre-defined threshold limit. The method of routing for wireless ad hoc and sensor networks is an energy efficient routing protocol, in that the routing path is selected to maximize the lifetime of an individual source-destination pair by selecting a route between them that is based on the energy levels of neighboring nodes without requiring an energy-intensive network flooding approach. For the case in which the current node of interest is the source node, and the destination node is not a neighbor of the source node, the method of routing for wireless networks includes the following steps: (a) defining a current node of interest, $C_N$, as a source node in the wireless sensor network, which includes n nodes, where n is an integer, the source node transmitting a message to a destination node, D; (b) selecting a next neighboring node, $N_N$, for forwarding of the message from the current node of interest, $C_N$, where the selection of the next neighboring node, $N_N$, is performed as: (i) measuring a remaining energy level respectively associated with each of the nodes, $RE_i$, where i=1, 2, . . . , n; (ii) setting a maximum threshold remaining energy level, $MAX_{RE}$, equal to $RE_1$; (iii) defining $N_N$ as the i-th node for i=1; (iv) setting i=i+1; and (v) if $RE_i > MAX_{RE}$, then setting $MAX_{RE}$ equal to $RE_i$ and defining the node $N_N$ as the i-th node, and if i≤n, then returning to step (iv); (c) redefining the current node of interest, $C_N$, as the node $N_N$; (d) defining a variable, token, to identify the current node of interest, $C_N$; and (e) if an acknowledgement message is not received at the source node from the destination node, then removing the current node of interest, $C_N$, identified by the variable token from the wireless sensor network and returning to step (b); otherwise, if an acknowledgement message is received, then the message has been transmitted from the source node to the destination node.

In an alternative embodiment, a pre-selected threshold time limit, $T_{th}$, may be used, such that in step (e) of the above, if the acknowledgement message is not received at the source node from the destination node within time limit $T_{th}$, then the current node of interest, $C_N$, is removed from the wireless sensor network.

In the above, the initial current node of interest, $C_N$, was the source node, S, and the destination node, D, did not belong to the set or list of neighbors of the source node, $N_{LS}$. For the case in which the initial current node of interest, $C_N$, is the source node, S, and the destination node, D, is a neighbor of the source node, then the message (in the form of a data packet or the like) is simply sent directly from source node S to destination node D. In the case where the initial current node of interest, $C_N$, is not the source node, S, and the destination node, D, does not belong to the set or list of neighbors of the source node, $N_{LS}$, then the source node, S, is removed from the array of potential current nodes of interest, $V[C_N]$ and the above procedure is performed. Lastly, in the case in which the initial current node of interest, $C_N$, is not the source node, S, and the destination node, D, is a neighbor of the source node, the current node of interest transmits the message (in the form of a data packet or the like) to the destination node, and the destination node transmits the acknowledgement message back to the source node.

These and other features of the present invention will become readily apparent upon further review of the following specification.

BRIEF DESCRIPTION OF THE DRAWINGS

FIG. 6A is a graph showing average travel distance for a message sent from a source node to a destination node as a function of actual Euclidean distance in the method of routing for wireless ad hoc and sensor networks according to the present invention.

FIG. 6B is a graph showing average travel distance for a message sent from a source node to a destination node as a function of actual Euclidean distance using the Dijkstra routing protocol.

FIG. 6C is a graph showing average travel distance for a message sent from a source node to a destination node as a function of actual Euclidean distance using a random node selection routing protocol.

Similar reference characters denote corresponding features consistently throughout the attached drawings.

DETAILED DESCRIPTION OF THE PREFERRED EMBODIMENTS

Figure 1:
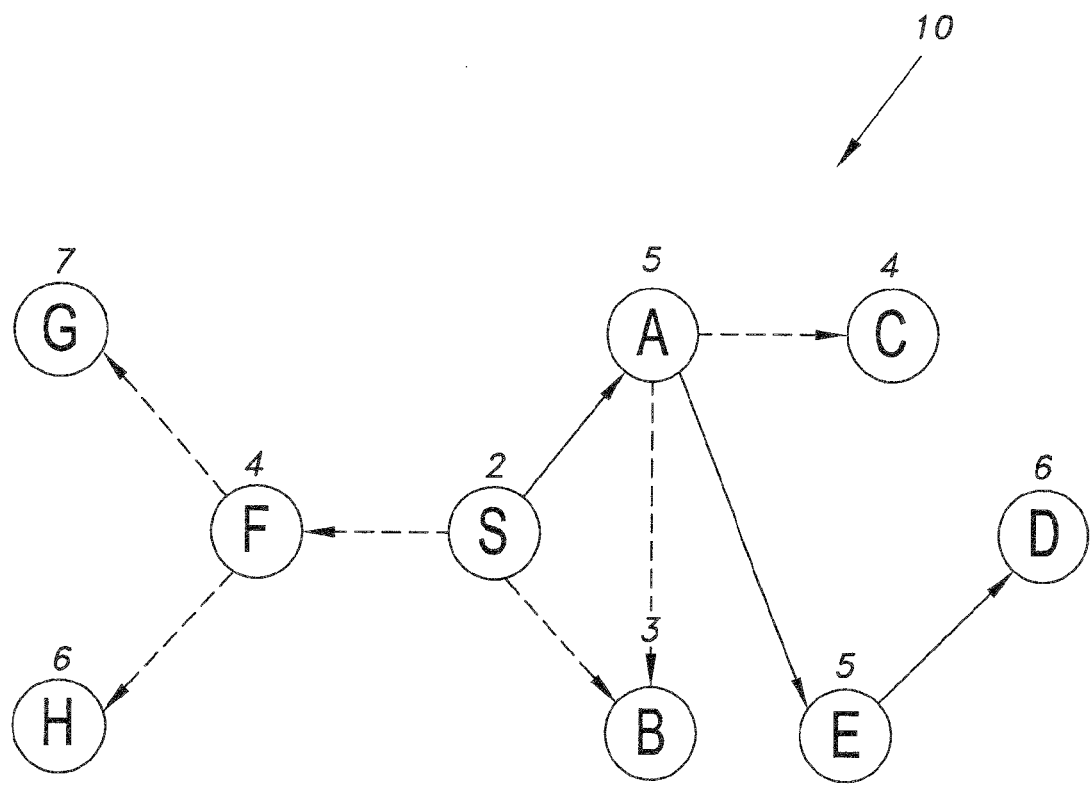
FIG. 1 is a schematic diagram illustrating an exemplary network topology for implementation of a method of routing for wireless ad hoc and sensor networks according to the present invention.

The method of routing for wireless ad hoc and sensor networks is a routing protocol that uses a "greedy" approach, selecting the best route having the maximum remaining energy above a pre-defined threshold limit. The method of routing for wireless ad hoc and sensor networks is an energy efficient routing protocol, in that the routing path is selected to maximize the lifetime of an individual source-destination pair by selecting a route between them that is based on the energy levels of neighboring nodes without requiring an energy-intensive network flooding approach. For the case in which the current node of interest is the source node, and the destination node is not a neighbor of the source node, the method of routing for wireless networks includes the following steps: (a) defining a current node of interest, $C_N$, as a source node in the wireless sensor network, which includes n nodes, where n is an integer, the source node transmitting a message to a destination node, D; (b) selecting a next neighboring node, $N_N$, for forwarding of the message from the current node of interest, $C_N$, where the selection of the next neighboring node, $N_N$, is performed as: (i) measuring a remaining energy level respectively associated with each of the nodes, $RE_i$, where i=1, 2, . . . , n; (ii) setting a maximum threshold remaining energy level, $MAX_{RE}$, equal to $RE_1$; (iii) defining $N_N$ as the i-th node for i=1; (iv) setting i=i+1; and (v) if $RE_i > MAX_{RE}$, then setting $MAX_{RE}$ equal to $RE_i$ and defining the node $N_N$ as the i-th node, and if i≤n, then returning to step (iv); (c) redefining the current node of interest, $C_N$, as the node $N_N$; (d) defining a variable, token, to identify the current node of interest, $C_N$; and (e) if an acknowledgement message is not received at the source node from the destination node, then removing the current node of interest, $C_N$, identified by the variable token from the wireless sensor network and returning to step (b); otherwise, if an acknowledgement message is received, then the message has been transmitted from the source node to the destination node.

In the above, the initial current node of interest, $C_N$, was the source node, S, and the destination node, D, did not belong to the set or list of neighbors of the source node, $N_{LS}$. For the case in which the initial current node of interest, $C_N$, is the source node, S, and the destination node, D, is a neighbor of the source node, then the message (in the form of a data packet or the like) is simply sent directly from source node S to destination node D. In the case where the initial current node of interest, $C_N$, is not the source node, S, and the destination node, D, does not belong to the set or list of neighbors of the source node, $N_{LS}$, then the source node, S, is removed from the array of potential current nodes of interest, $V[C_N]$ and the above procedure is performed. Lastly, in the case in which the initial current node of interest, $C_N$, is not the source node, S, and the destination node, D, is a neighbor of the source node, the current node of interest transmits the message (in the form of a data packet or the like) to the destination node, and the destination node transmits the acknowledgement message back to the source node.

As is well known in the field of wireless networks, wireless sensor nodes and the like typically have onboard power sources in the form of rechargeable batteries or the like, and also typically have onboard power level sensors for measuring the charge level of their respective power sources. It should be understood that the above method may be applied to any suitable type of wireless ad hoc and/or wireless sensor network, and that any suitable type of charge or power sensors or monitors may be used for measurement of the remaining energy, $RE_i$, associated with the i-th wireless node.

In the exemplary topology of FIG. 1, a simplified wireless network 10 is shown with seven nodes for illustrative purposes. Each node in FIG. 1 is labeled with its respective remaining energy level available for transfer of data packets (ranging between a level of "2" and a level of "7" in simplified energy units for the illustrative example of FIG. 1). For purposes of simplicity, the network of FIG. 1 is assumed to be homogeneous, where all of the nodes have the same data transfer rate and transmission range.

In the network topology of FIG. 1, node S acts as the sender and D is the receiver. Node S has three neighbors within its transmission range, Tr, namely, nodes A, B and F. Thus, source node S can determine that it has three alternate routes to use as a next-forwarder node if it performs a local "greedy" decision. Following the present method, source node S sends the data packet to node A because node A has the maximum measured residual energy among all the neighbors of node S, i.e., as shown, node A has an energy level of 5, node B has an energy level of 3, and node F has an energy level of 4. As noted above, each wireless node may make its own local measurement of remaining energy level in its power source, as is conventional in wireless sensor nodes and the like. Node A then acts as forwarder.

Node A then checks its neighbor list to find the intended destination. If the destination D is found in its neighbor list, $N_{LS}$, node A directly sends the data packet to that particular neighbor. Otherwise it looks for an alternate route. In this example, node A cannot find the destination D in its list $N_{LS}$. Thus, node A checks to see which node has the maximum energy remaining among its neighbors. Node A determines that node E has the maximum remaining energy and forwards the data packet to node E. Node E finds that destination node D is in its neighbor list. Thus, node E sends the data packet directly to destination node D without further checking the remainder of its neighbors (except for the sender S) within its transmission range.

Figure 2:
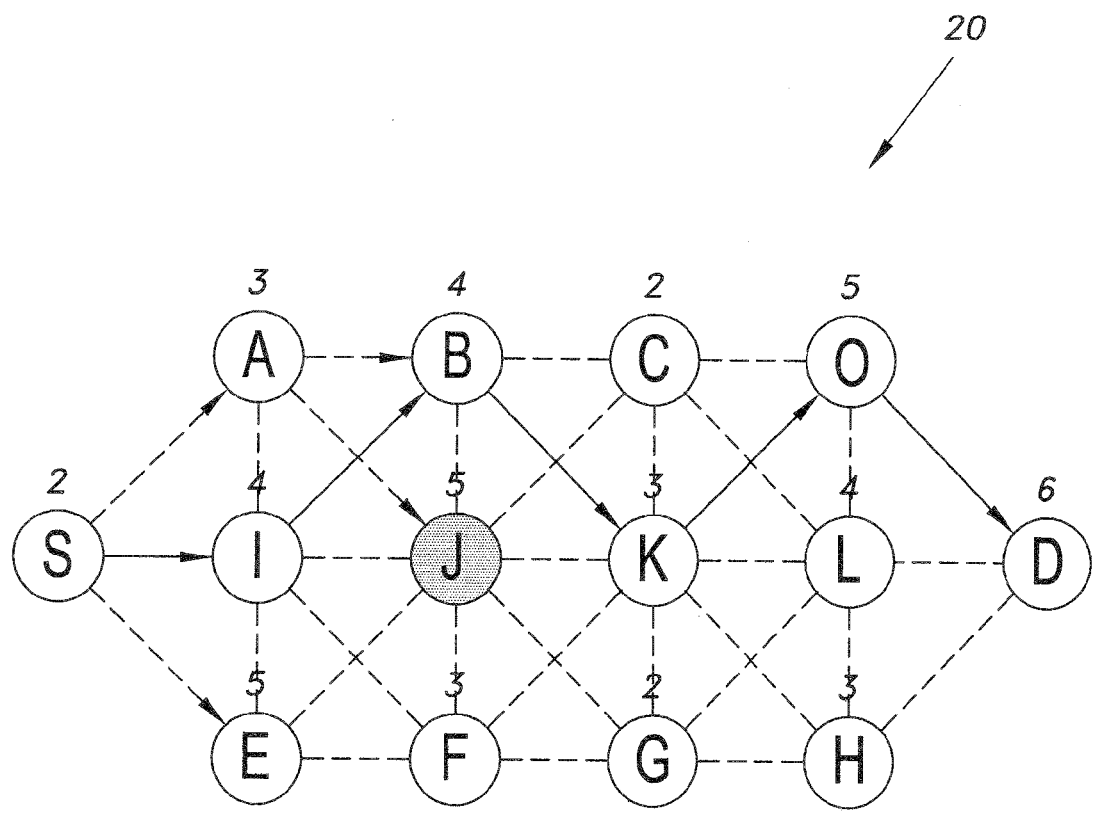
FIG. 2 is a schematic diagram illustrating a further exemplary network topology for implementation of the method of routing for wireless ad hoc and sensor networks according to the present invention, specifically showing routing in the network with failure of a single intermediate node.

The present method is a reactive routing protocol. Thus, if any node fails during data packet transmission, the data packet is forwarded to any other available neighbor node. In the example of FIG. 2, sender node S of wireless network topology 20 wants to send a data packet to destination node D. First the packet goes to neighbor node E, since node E has the maximum remaining energy among all the neighbors of source node S. As in the previous example, node E is supposed to forward the packet to node J based on remaining energy levels of neighboring nodes. However, if node J becomes unavailable or its remaining energy becomes lower than the specified energy threshold value, then node E needs to find another alternate route to reach the destination. Thus, node E finds the next best transmitter (node I) and continues to follow the protocol as described above. In the example of FIG. 2, the complete route is as follows: S→I→B→K→O→D. The path/route formation continues even if there is any failure of intermediate nodes.

Figure 3:
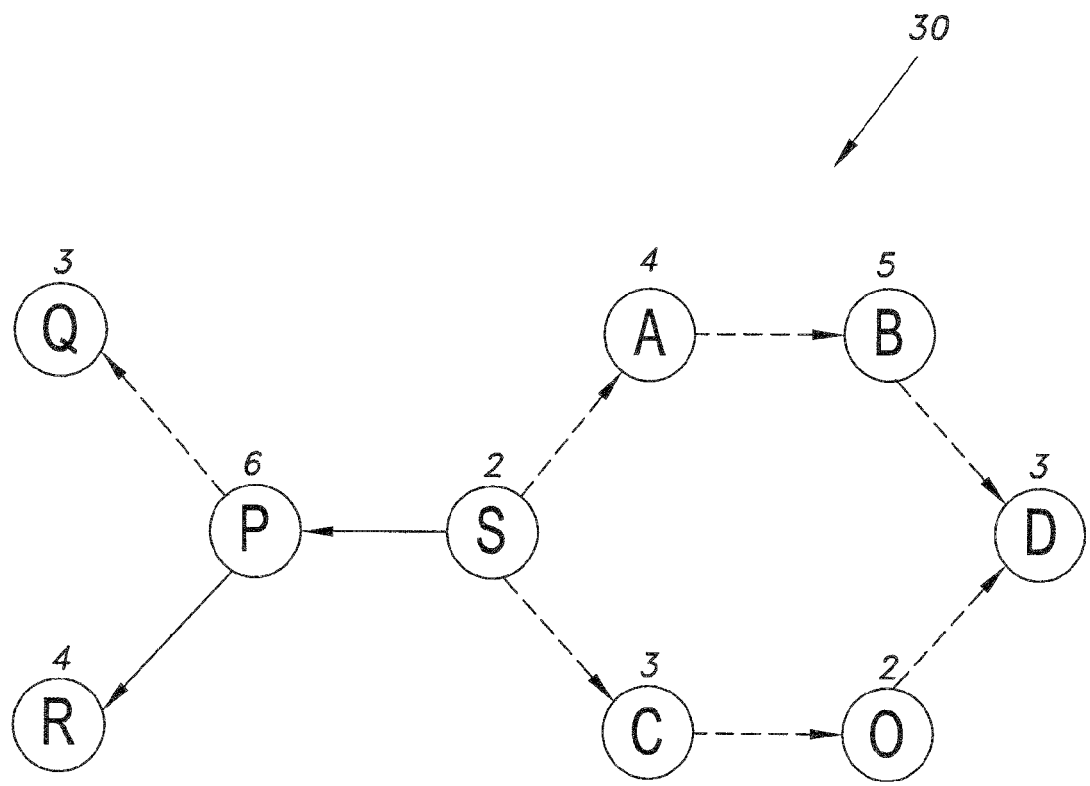
FIG. 3 is a schematic diagram illustrating another exemplary network topology for implementation of an alternative embodiment of the method of routing for wireless ad hoc and sensor networks according to the present invention.

In the example of FIG. 3, the illustrated network topology 30 makes it somewhat difficult for the sender node S to transmit the data packet to destination node D. Here, based on remaining energy levels alone, the data packet will be transmitted in the wrong direction. The sender node will have to wait for a certain specified time limit, $T_{th}$, for receiving the acknowledgement message from the destination node before it retransmits the original data packet. If the waiting time exceeds the threshold value $T_{th}$, the sender node S selects the neighboring node with the next best residual energy. In the example of FIG. 3, source S will select node A after this waiting time and proceed as described above.

As is conventionally known in wireless sensor networks, there is a minimum threshold remaining energy value, $E_{th}$, required to sort out those nodes that are in need of energy. As in a conventional network, several mobile chargers are preferably deployed within the region of interest to serve these sensor nodes with timely recharging. Each and every node typically has energy storage between 0.3-1.0 J initially. If the energy of any node reaches a level below 0.2 J, this node is considered to be an inactive link. Thus, 0.2 J may be defined as the minimum threshold energy value.

Figure 4:
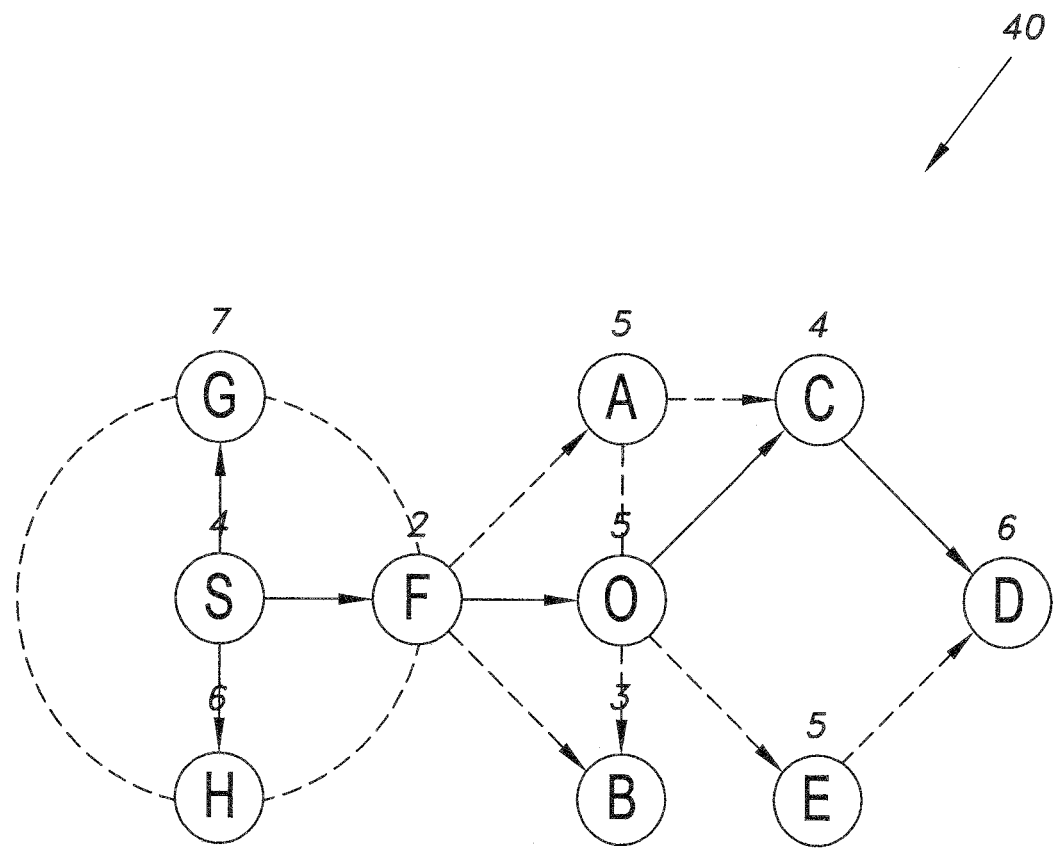
FIG. 4 is a schematic diagram illustrating a further exemplary network topology for implementation of the method of routing for wireless ad hoc and sensor networks according to the present invention.

The present method relies on the total messages exchanged between source node S and destination node D, T, at any point, being defined by $T=2n_1+1+\Sigma_{i=2}^{n-2}2(n_i-1)$. In order to illustrate this, exemplary network topology 40 of FIG. 4 is considered, in which source node S wants to send some information to destination node D. Initially, the source node S needs to send a request message for remaining energy availability from each of its neighbors. If source node S has n neighbors in its transmission/sensing vicinity, then the total message exchange required at the source node is $T_s=2n_1$. Here, $n_1$ denotes the total number of neighbor nodes of source node S. The intermediate nodes have to exchange $T_i=\Sigma_{i=2}^{n-2}2(n_i-1)$ messages, as there is one node that does not need to advertise for packet sending to the destination node D. The remaining energy comparison query stops at the (n-2)-th node. The (n-1)-th node just forwards the message to the destination node D, which needs only one message. Thus, the total overhead, T, is given by $T=T_S+T_i+T_{n-1}$. Substituting this expression with the above results in a total message overhead given by $T=2n_1+1+\Sigma_{i=2}^{n-2}2(n_i-1)$. The initial message query, which may be referred to as a "hello" message, is required for the local link discovery before any data is transmitted between sensors. This helps the network to find a prospective neighborhood and elect the most suitable node to carry the message to the next hop.

It should be noted that in any connected network, an outage may occur due to only a single neighbor. This can be seen by considering that if any forward path contains such an intermediate node and if it only has its neighbor as a previously selected intermediate node, then the current sensor node must increase its own sensing range to reach new neighbors. This can cause extra overhead when the network becomes sparsely scattered. For example, it is assumed that nodes $u_1$, $u_2$, $u_3$, $u_4$, $u_5$ represent a forward path that has to lead until the destination $u_{10}$. Considering a message at $u_5$, which does not have any other node within its neighborhood except the previous node $u_4$, then $u_5$ should either increase its sensing range to find other neighbors, or inform $u_4$ to find other available transmission routes. This issue will be very difficult to handle if there is no neighbor found, even after increasing the sensing range. Such a situation is more likely to occur in very sparsely scattered networks.

The present method always selects the path that ensures maximum data flow. This can be proven by considering a source node S, which has a set of neighbors represented as $\{N\}=\{N_1, N_2, \ldots, N_n\}$ and a set of corresponding weights (i.e., remaining energy at each neighbor node) represented as $\{W\}=\{w_1, w_2, \ldots, w_n\}$. The present method selects the neighbor with the highest weight at each step. By comparison, random selection selects any one of the n neighbors (i.e., the comparative random method gives no consideration to the weight). Thus at each step, random selection has the opportunity to select the best neighbor with a probability of $P=1/n$, which is much smaller than 1. Comparison of random selection against the present method shows that the present method has the advantage at each step of the routing. The probability of selecting the best route with the highest energy between source and destination is always a probability of 1 for the present method, compared against a relatively small fraction for random selection. If the number of hops increases, the performance degrades for random selection; i.e., $P=1$ for the present method, but random selection yields:

$$P = \frac{1}{n_1} \times \frac{1}{n_2} \times \frac{1}{n_3} \times \ldots \times \frac{1}{n_k},$$

where $n_1, n_2, \ldots, n_k$ represent the neighbors at each hop between the source and destination nodes. Even considering a scenario in which each intermediate relay node has a similar number of neighbors, m, and total hops k, then:

$$P = \left(\frac{1}{m}\right)^k$$

for the random selection protocol, compared against $P=1^m=1$ for the present method.

In order to show the efficiency of the present method, the present method is compared against a random selection protocol, as described above, and the Dijkstra protocol. In the case of random neighbor selection, no weight (i.e., remaining energy value) is used. Any node can be selected as the next forwarder node as long as that node is not already traveled. This is ensured by sending the list of nodes already traversed, Tn, and the data itself. For example, the source node S will forward these two pieces of information to any of its neighbors $n_i$, where i represents the number of hops.

In the Dijkstra protocol, a minimum length path is used to select intermediate nodes. The length of a path, $p = <v_0, v_1, \ldots, v_k>$, is the sum of the weights (i.e., distance) of its constituent edges. If there is a path between u and v, the distance would be either the minimum or infinite. Here, $\text{length}(p) = \sum_{i=1}^{k} w(v_{i-1}, v_i)$.

In simulations performed for the purpose of comparing the three protocols, the network topologies were configured as connected. There was no cut point and at least a single path from any node to any other node in the network. The simulation area was given as 200 m×200 m, and different numbers of nodes (80, 100, 120, and 150) were deployed in this area. The transmission ranges were varied for ten different topologies. The results are given below for 100 nodes for purposes of simplicity. Thirty nodes were selected randomly as source nodes, and another node that was not within the source list was selected as the destination node. Each simulation was run thirty times. For example, a topology count of $TP_{count}=10$, a source count of $S_{count}=30$, and a transmission range, $TR_{range}$, of 50 m, 60 m, 70 m, and 80 m, with a single destination, was used for each simulation setup. Additionally, each simulation was run $S_{count}$ times to ensure all source-destination pairs were considered. The destination node was varied for different simulation setups. The average distance traversed by the data packet, the message flow, and the energy consumption were computed for each simulation setting.

The metrics used for the experimental comparison included average travel distance, Euclidean distance, message flow, energy consumption and traveled nodes. The average travel distance is a measure of the total distance from source to destination, including the intermediate hops, for each simulation over a certain selected path. For example, if the path distance between u and v, including intermediate nodes, is denoted by $\delta(u, v)$ for a single simulation setup, then the average travel distance, $\delta_{avg}(u, v)$, is given by:

$$\delta_{avg}(u, v) = \frac{\sum_{k=1}^{S_{count}} \delta(u_k, v)}{S_{count}}.$$

The Euclidean distance represents the direct distance between any source-destination pair. If the coordinates of nodes u and v are defined as $(x_1, y_1)$ and $(x_2, y_2)$, respectively, then the Euclidean distance is given by the Pythagorean Theorem, i.e., $d = \sqrt{(x_2-x_1)^2 + (y_2-y_1)^2}$. Each source-destination pair has both an actual travel distance and a Euclidean distance. The source was changed for each simulation without changing the destination, thus providing multiple sets of Euclidean distance. For example, if the set of source nodes were defined as $u_S = \{u_1, u_2, \ldots, u_n\}$ and the destination node was v, then the Euclidian distance set, ED, was $ED = \{d_1, d_2, \ldots, d_n\}$, where $d_i \sqrt{(d_i-v)^2}$, $\forall i \in R$. Thus, the average Euclidean distance is:

$$ED_{avg} = \frac{\sum_{i}^{n} d_i}{n}, \forall i \in R.$$

Message flow, average travel distance, and energy consumption were all compared based on Euclidean distance.

The message flow is the number of bits that can be transmitted from a source and destination pair before any intermediate node collapses due to insufficient energy. The energy consumption is the energy consumed by the total bits transmitted from source to destination. A first-order energy model was used for the calculation. The traveled nodes represent each node forwarding the message, along with the previous nodes through which the message came through. For example, if node $u_{25}$ sends a message to node $u_{100}$ and the previous traveled nodes list received at $u_{25}$ is $u_0$, $u_{11}$, $u_{22}$, then $u_{25}$ adds itself in the traveled nodes list and embeds with the message before sending to node $u_{100}$. The sent message appears as <<$u_0$, $u_{11}u_{22}$, $u_{25}$>, msg>, which is then received by node $u_{100}$.

As noted above, the area for each simulation was defined as 200 m×200 m with nodes differing for various simulations numbering 80, 100, 120 or 150. A total of ten different topologies were used with 30 different source nodes selected per round. Varying transmission ranges of 50 m, 60 m, 70 m and 80 m were used, and the simulated message (i.e., the transmitted data packet) had a length of 100 bytes. The initial remaining energy per node was between 0.3 J and 1.0 J, and the threshold energy was selected to be 0.2 J.

Figure 5:
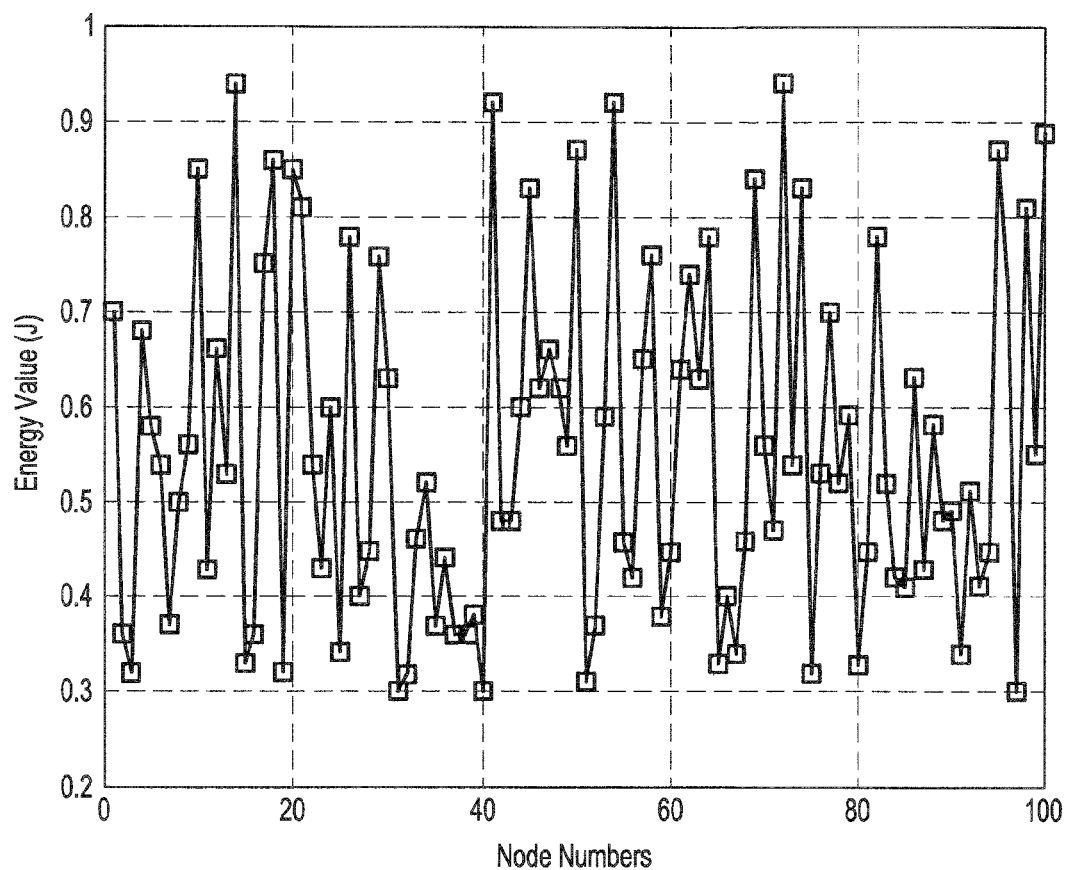
FIG. 5 is a graph showing energy distribution per node in a simulated network of one hundred wireless sensor nodes for implementation of the method of routing for wireless ad hoc and sensor networks according to the present invention.

For purposes of simplicity, a first-order radio model was used in the simulations. A typical wireless sensor node includes several components, such as a data processor unit, a micro-sensor unit, a radio communication subsystem with transmitter/receiver electronics, an antenna, an amplifier and a power supply. The simulations considered only the energy emissions associated with the radio components of the nodes. Additionally, it was assumed that the radio dissipates an energy of $E_{elec}$=50 nJ/bit to drive the transmitter or receiver circuitry, and an amplifier energy dissipation density of $E_{amp}$=100 pJ/bit/m². An $r^2$ energy loss due to channel transmission was also assumed. Thus, the transmission energy required to send a k-bit message a distance d is given by $E_{Tx}(k, d) = E_{Tx\text{-}elec}(k) + E_{Tx\text{-}amp}(k, d)$, or $E_{Tx}(k, d) = E_{elec} \cdot k + \epsilon_{amp} \cdot k \cdot d^2$. The receiving energy for the radio is given by $E_{Rx}(k) = E_{Rx\text{-}elec}(k) = E_{elec} \cdot k$. It was also assumed that the transmission energy was symmetric, i.e., the transmission energy for sending a message from node A to node B was similar to the opposite situation for a particular signal-to-noise ratio (SNR). The energy profile for each link is highly dependent on both the distance at each step and the packet size, which was the same for all simulations for the sake of simplicity. FIG. 5 shows energy distribution for a simulation involving 100 nodes in the simulated network.

FIGS. 6A, 6B and 6C show average travel distance for a message sent from a source node to a destination node for the present method, the Dijkstra protocol, and the random selection protocol, respectively. Comparing FIGS. 6A, 6B and 6C, it can be seen that all three routing protocols perform similarly for a relatively short distance between the source node and the destination node. This is because, in such situations, the transmission range is greater than or equal to the actual Euclidean distance. However, when Euclidean distance increases, the actual travel distance increases due to the increasing search space for the source and intermediate relay nodes. At each step, the node selects the node that has the highest remaining energy level without knowing the direction of the destination node. This creates additional overhead for the actual distance traveled. To minimize this issue, the network can use either a timer or a hop count, after which the node will try selecting an alternate route, which is another probabilistic approach.

As shown, when the transmission range is about 50 meters, the present method performs relatively poorly compared to the Dijkstra protocol. In the present method, the travel distance is almost 4.5 times more than that of the Dijkstra protocol because the Dijkstra protocol uses the shortest path between source and destination nodes. At each relay node, the Dijkstra protocol computes the total distance traveled thus far and compares this against other prospective routes to ensure the minimum distance. On the other hand, the random selection protocol travels the greatest distance of the three protocols, having an average travel distance almost double that of the present method and approximately eight times that of the Dijkstra protocol for increased Euclidean distance.

Figure 7:
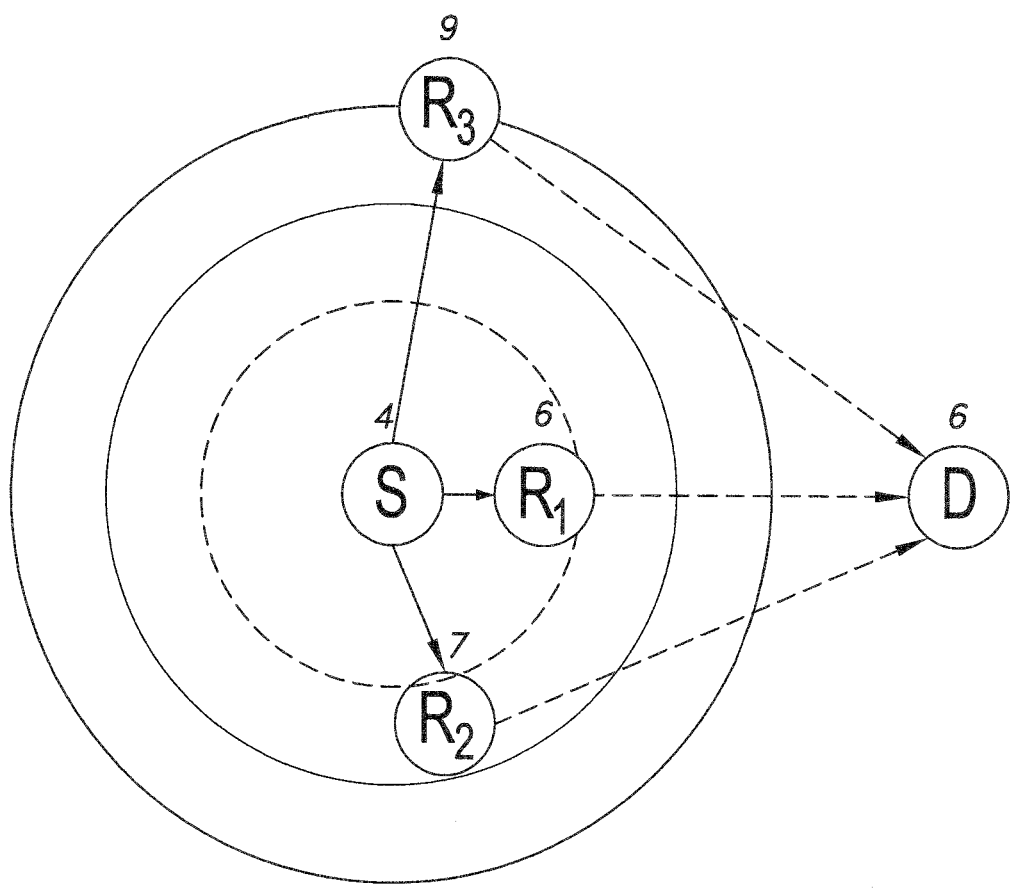
FIG. 7 is a schematic diagram illustrating the different transmission paths for a single source-destination pair in the method of routing for wireless ad hoc and sensor networks according to the present invention.

However, as shown in FIG. 6A, for transmission ranges of 60 m, 70 m and 80 m, the results are similar at every point for Euclidean distance. This can be explained by referring to FIG. 7, which illustrates three different transmission ranges for a single source-destination pair. Initially, source node S has neighbor $R_1$ having a remaining energy level of 5 units when the transmission range is 60 m. If the range increases to 70 m, then the neighbor with the maximum remaining energy changes to $R_2$. Similarly, $R_3$ is selected when the transmission range is 80 m. This illustrates that such a scenario can lead to increased travel distance, even if the transmission range is higher. Here, S→$R_3$→D represents the maximum distance among the three chosen paths.

The opposite scenario is also true when an increased transmission range creates the opportunity to select those neighbors that are much closer to the destination, compared with previously selected neighbors. Although the general trend is enhancement as the transmission range increases, both scenarios are likely to occur in the present method. Thus, the overall effect produces similar results at each step when the transmission range is greater than 60 meters.

Figure 8A:
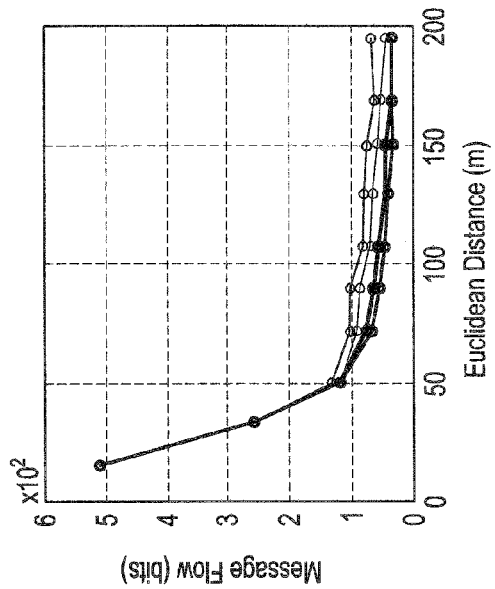
FIG. 8A is a graph showing message flow, measured in bits, for a message sent from a source node to a destination node as a function of actual Euclidean distance in the method of routing for wireless ad hoc and sensor networks according to the present invention.
Figure 8B:
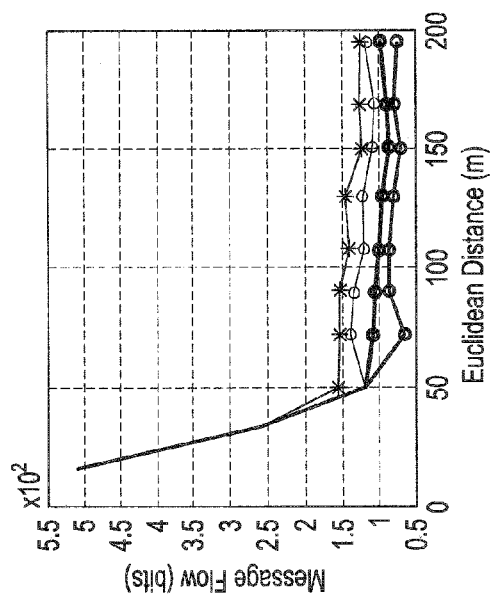
FIG. 8B is a graph showing message flow, measured in bits, for a message sent from a source node to a destination node as a function of actual Euclidean distance using the Dijkstra routing protocol.
Figure 8C:
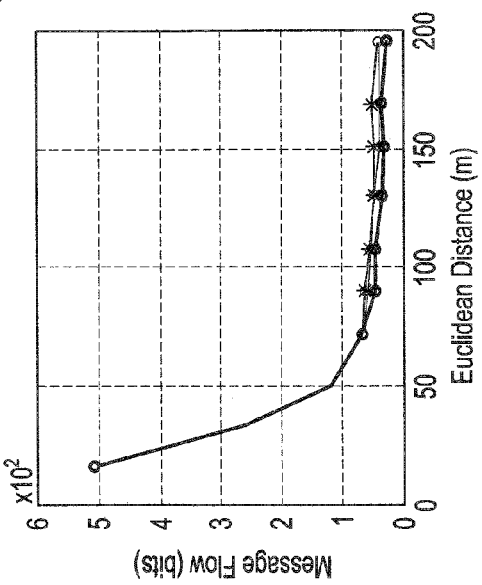
FIG. 8C is a graph showing message flow, measured in bits, for a message sent from a source node to a destination node as a function of actual Euclidean distance using a random node selection routing protocol.

One of the goals of the present method is to maximize the message flow, specifically by selecting the 450 intermediate nodes that have higher remaining energies. FIGS. 8A, 8B and 8C compare message flow between the present method, the Dijkstra protocol, and the random selection protocol. Message flow is measured by the number of bits that can be traveled via a certain path before any intermediate node fails. Such events are typically referred to as "energy outages". One can immediately see in FIG. 8C that increased transmission range does not make any difference for the random selection protocol when the Euclidean distance is greater than 60 meters.

Figure 9:
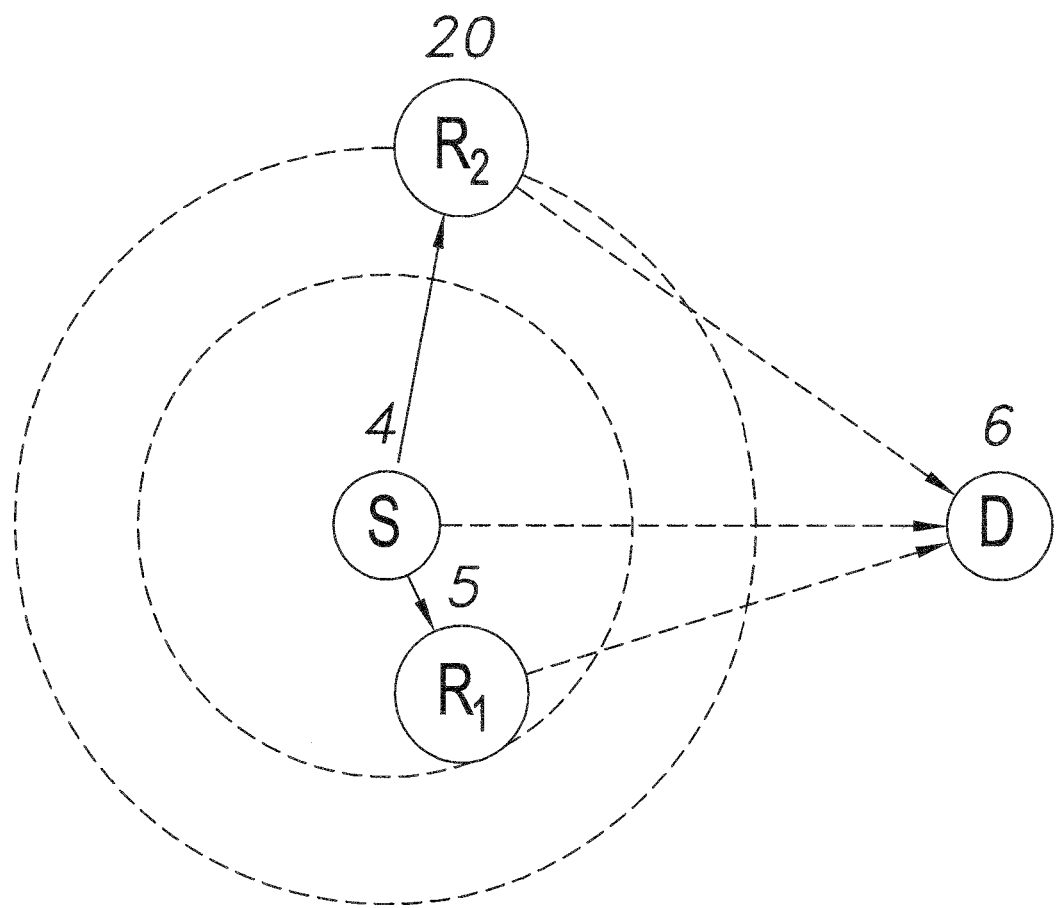
FIG. 9 is a schematic diagram illustrating path selection for comparison between the Dijkstra routing protocol and the method of routing for wireless ad hoc and sensor networks.

FIG. 8A shows a steady message flow for the present method for longer distances, specifically in cases where the Euclidean distance is greater than 150 meters, for all transmission ranges. On the other hand, FIG. 8B shows overlapping and decreasing values for message flow when the Euclidean distance is higher for all transmission ranges. Additionally, the present method provides significant improvements in message flow compared to the Dijkstra protocol for every transmission range and higher source-destination distances. This can be explained using a simple example, illustrated in FIG. 9, where the source node S and the destination node D have intermediate relay nodes $R_1$ and $R_2$. Since $R_1$ is closer to S, the Dijkstra protocol will select it as its relay, even though the node has a lower remaining energy level than that of $R_2$. In this case, the present method will select $R_2$ as a forwarder, even though it takes a longer travel path between nodes S and D. In the end, the path selected by the present method will exhibit a greater message flow rate than that of the Dijkstra protocol, since as $RE(R_1) < RE(R_2)$, where RE represents the remaining energy.

Figure 10B:
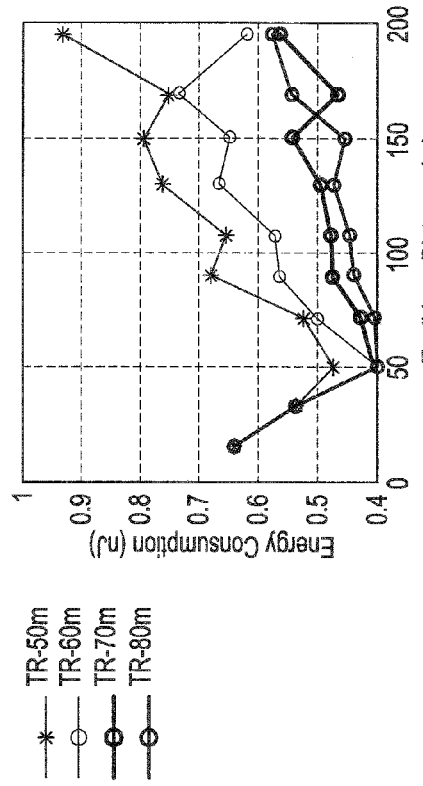
FIG. 10B is a graph showing energy consumption as a function of actual Euclidean distance using the Dijkstra routing protocol.
Figure 10A:
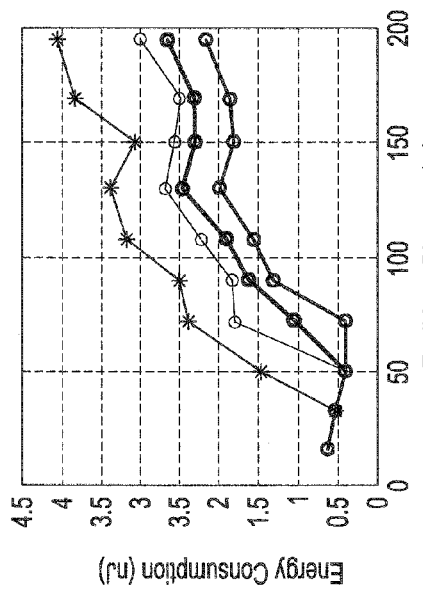
FIG. 10A is a graph showing energy consumption as a function of actual Euclidean distance in the method of routing for wireless ad hoc and sensor networks according to the present invention.
Figure 10C:
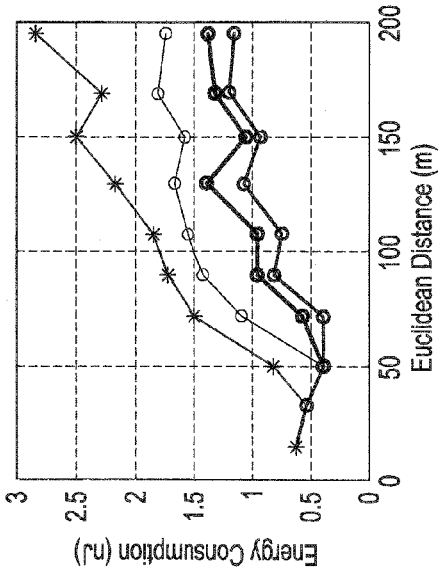
FIG. 10C is a graph showing energy consumption as a function of actual Euclidean distance using a random node selection routing protocol.

FIGS. 10A, 10B, and 10C show energy consumption for the present method, the Dijkstra protocol, and the random selection protocol, respectively. The energy consumption is calculated from the message flow. Thus, the present method exploits maximum energy consumption among the three protocols. When the transmission range is 50 meters, the energy consumption is the highest, as it takes a greater distance to travel. Energy consumption decreases with increment of transmission range, since the probability of finding the destination within a lower number of hops increases. For example, if it takes 10 hops to reach the destination node from the source node when the transmission range is 50 m, it takes 5 hops when the transmission range is 80 m. Additionally, each node has a remaining energy level value between 0.3-1.0 J, and the threshold value is 0.2 J. If the energy required at each hop is 0.2 nJ for 100 bits, then the energy consumed for 500 bits (assuming equal hop distance) is $E_{50}=10\times0.2$ nJ$\times5=10$ nJ. Similarly, $E_{80}=5\times0.2$ nJ$\times5=5$ nJ. Thus, the total energy required for same number of message/packets is larger for a smaller range.

FIG. 10B shows the energy consumption for the Dijkstra routing protocol. One can see that there is no particular pattern for energy consumption in terms of increasing range or distance. The total energy consumption in the Dijkstra protocol is four to five times less than that of the present method. This can also be used as the metric for link lifetime. FIG. 10C shows the energy consumption for the random selection protocol, which is also much smaller than that of the present method. There are two causes for the increase in energy consumption in the present method. The first cause is the longer distance between the transmitter and receiver, which necessitates a higher transmission power. The second cause is the relatively long data transmission session.

From the above, all three routing protocols perform similarly when the Euclidean distance is below 50 meters. Between 50 m and 70 m, the Dijkstra routing protocol shows the best overall performance, but the probability of power outage with the Dijkstra protocol is high, which causes frequent disruptions in the network. The present method and the random selection method perform similarly in this range. However, for Euclidean distances over 70 meters, the present method outperforms the random selection method by about 40% in overall performance. Further, the present method shows relatively low sensitivity to Euclidean distance in this range with overall efficiency maintaining the same level of performance.

It is to be understood that the present invention is not limited to the embodiments described above, but encompasses any and all embodiments within the scope of the following claims.

We claim:

1. A method of routing for wireless sensor networks, comprising the steps of:
    (a) defining a current node of interest, $C_N$, as a source node in a wireless sensor network comprising n nodes, where n is an integer, the source node transmitting a message to a destination node, D;
    (b) selecting a next neighboring node, $N_N$, having a maximum remaining energy level to maximize the lifetime of the source node-destination node pair without requiring an energy-intensive network flooding approach for forwarding of the message from the current node of interest, $C_N$, wherein the step of selecting the next neighboring node, $N_N$, comprises the steps of:
        (i) measuring a remaining energy level respectively associated with each of the n nodes, $RE_i$, where i=1, 2, . . . , n;
        (ii) setting a maximum threshold remaining energy level, $MAX_{RE}$, equal to $RE_1$;
        (iii) defining $N_N$ as the i-th node, wherein i=1;
        (iv) setting $i=i+1$; and
        (v) if $RE_i>MAX_{RE}$, then setting $MAX_{RE}$ equal to $RE_i$ and defining the node $N_N$ as the i-th node, and if i≤n, then returning to step (iv);
    (c) redefining the current node of interest, $C_N$, as the node $N_N$;
    (d) defining a variable, token, to identify the current node of interest, $C_N$;
    (e) if an acknowledgement message is not received at the source node from the destination node, then removing the current node of interest, $C_N$, identified by the variable token, from the wireless sensor network and returning to step (b).

2. A method of routing for wireless sensor networks, comprising the steps of:
    (a) defining a current node of interest, $C_N$, as a source node in a wireless sensor network comprising n nodes, where n is an integer, the source node transmitting a message to a destination node, D;
    (b) selecting a next neighboring node, $N_N$, having a maximum remaining energy level to maximize the lifetime of the source node-destination node pair without requiring an energy-intensive network flooding approach for forwarding of the message from the current node of interest, $C_N$, wherein the step of selecting the next neighboring node, $N_N$, comprises the steps of:
        (i) measuring a remaining energy level respectively associated with each of the n nodes, $RE_i$, where i=1, 2, . . . , n;
        (ii) setting a maximum threshold remaining energy level, $MAX_{RE}$, equal to $RE_1$;
        (iii) defining $N_N$ as the i-th node, wherein i=1;
        (iv) setting $i=i+1$; and
        v) if $RE_i>MAX_{RE}$, then setting $MAX_{RE}$ equal to $RE_i$ and defining the node $N_N$ as the i-th node, and if i≤n, then returning to step (iv);
    (c) redefining the current node of interest, $C_N$, as the node $N_N$;
    (d) defining a variable, token, to identify the current node of interest, $C_N$;
    (e) if an acknowledgement message is not received at the source node from the destination node within a preselected threshold time limit, $T_{th}$, then removing the current node of interest, $C_N$, identified by the variable token, from the wireless sensor network and returning to step (b).

* * * * *